(12) United States Patent
Spear et al.

(10) Patent No.: US 10,714,857 B2
(45) Date of Patent: Jul. 14, 2020

(54) CONNECTOR WITH RETENTION FEATURE

(71) Applicants: Brian Hartwell Spear, Worcester, MA (US); Nicolas Martinez, Maisons-Alfort (FR)

(72) Inventors: Brian Hartwell Spear, Worcester, MA (US); Nicolas Martinez, Maisons-Alfort (FR)

(73) Assignee: Prothia S.à.r.l., Paris (FR)

( * ) Notice: Subject to any disclaimer, the term of this patent is extended or adjusted under 35 U.S.C. 154(b) by 167 days.

(21) Appl. No.: 15/964,554

(22) Filed: Apr. 27, 2018

(65) Prior Publication Data

US 2019/0305456 A1   Oct. 3, 2019

(51) Int. Cl.
| | | |
|---|---|---|
| *H01R 13/207* | (2006.01) |
| *H01R 13/622* | (2006.01) |
| *H01R 4/50* | (2006.01) |
| *H01R 4/30* | (2006.01) |
| *H01R 11/26* | (2006.01) |
| *H01R 13/24* | (2006.01) |
| *F16B 41/00* | (2006.01) |

(52) U.S. Cl.
CPC .......... *H01R 13/207* (2013.01); *H01R 4/301* (2013.01); *H01R 4/5025* (2013.01); *H01R 13/2471* (2013.01); *H01R 13/622* (2013.01); *F16B 41/002* (2013.01); *H01R 11/26* (2013.01)

(58) Field of Classification Search
CPC .... H01R 13/622; H01R 11/26; H01R 13/207; H01R 4/489; H01R 4/301; H01R 4/5025; H01R 13/2471
USPC .......................................... 439/462, 857, 858
See application file for complete search history.

(56) References Cited

U.S. PATENT DOCUMENTS

| | | | | |
|---|---|---|---|---|
| 2,454,829 A | * | 11/1948 | Neijstrom | ............ H01R 4/5025 439/805 |
| 8,147,280 B2 | * | 4/2012 | Fernandez | ............ H01M 10/48 439/754 |

FOREIGN PATENT DOCUMENTS

DE      102016209728 A1 * 12/2017 ............. H01R 11/26

* cited by examiner

*Primary Examiner* — Amy Cohen Johnson
*Assistant Examiner* — Paul D Baillargeon
(74) *Attorney, Agent, or Firm* — Reinhart Boerner Van Deuren P.C.

(57) ABSTRACT

A cable assembly and associated connector are provided. The cable assembly includes a connector and a length of cable for conducting an electrical current. The connector includes a connector body and a cap threadably engaging the connector body. The cap and connector body each include abutment surfaces arranged to interact with one another to provide a retention feature such that the cap is not inadvertently removed from the connector body.

17 Claims, 3 Drawing Sheets

CONNECTOR WITH RETENTION FEATURE

CROSS-REFERENCE TO RELATED PATENT APPLICATION

This patent application claims priority to French Patent Application No. 1852741, filed Mar. 29, 2018, the entire teachings and disclosure of which are incorporated herein by reference thereto.

FIELD OF THE INVENTION

This invention generally relates to cables for conducting electrical signals, and more particularly to cable assemblies and their associated connectors, and even more particularly to cable assemblies with connectors used to connect to single pin style contacts.

BACKGROUND OF THE INVENTION

Medical devices often use multi-polar electrode configurations in order to measure electrophysiological signals (such as those produced by muscle activity) and in order to send impulses into tissue (such as those used for muscle stimulation). The electrodes connected to the patient transmit impulses from generators to patients and/or physiological signals of patients to measuring devices. The proximal conductive extremities of many medical electrodes are pins. The electrode proximal pins often connect directly to devices and in some situations cables or extensions are connected to electrodes at one end and to devices at the other.

One method of connection to the aforementioned pins uses a cap that when screwed down reduces the diameter described by threaded claws contained internally within the cap. The claws are used to form a contact with the pin. To remove the connector from the pin, one simply unscrews the cap to increase the diameter described by the claws therein. As a result, a diametrical clearance is provided between the pin and the claws, allowing the pin to slide out of the claws.

While such a connection style has proven quite useful, when the connector is intended to be used repeatedly, unintended removal and loss of the above-described cap prevents reliable clamping and good contact. Absence of the cap thus compromises electrical conduction. The consequence of this may be failure of the medical device system due to poor electrode to device conductivity.

As such, there is a need in the art for a connector which overcomes the above deficiencies. These and other advantages of the invention, as well as additional inventive features, will be apparent from the description of the invention provided herein.

BRIEF SUMMARY OF THE INVENTION

In one aspect, the invention provides a cable assembly. An embodiment of such a cable assembly includes a cable having an end and a connector connected to the cable at the end thereof. The connector includes a connector body defining a longitudinal axis of the connector as well as a cap threadably engaging the connector body. The cap is movable in an opening direction and closing direction along the longitudinal axis of the connector. Movement in the opening direction increases a diameter of a pin opening in the connector body, and movement in the closing direction reduces the diameter of the pin opening. Continued movement of cap in the opening direction results in an axial abutment of a first abutment surface of the connector body and a second abutment surface of the cap within an interior annular space defined by the cap.

In an embodiment according to this aspect, the connector body has a jaw portion defining a first outer diameter of the connector body and a body portion defining a second outer diameter of the connector body. The jaw portion extends from an end of the body portion. The second diameter is less than the first diameter.

In an embodiment according to this aspect, the cap has a bore extending through the cap. A threaded portion of the bore defines a third diameter which is less than the first diameter. The threaded portion of the bore of the cap threadably engages a threaded portion of the connector body. An axial extent of the threaded portion of the threaded bore defines the second abutment surface.

In an embodiment according to this aspect, the connector body has a jaw portion and a body portion, the jaw portion extending from an end of the body portion. The cap defines an interior annular space. A radial extension of the jaw portion extends radially into the interior annular space and is axially confined within the annular space.

In an embodiment according to this aspect, the connector body includes a plurality of slits such that a portion of the connector body is defined by a plurality of discrete axial projections.

In an embodiment according to this aspect, the connector body has a jaw portion and a body portion, the jaw portion extending from an end of the body portion. The jaw portion includes an angled outer surface. The angled outer surface is arranged at an obtuse angle relative to the longitudinal axis. The connector body defines a pin passage having a pin well formed at an end of the pin passage. The pin well is configured to receive a portion of a pin of a pin connector.

In another aspect, a connector for a cable assembly is provided. An embodiment of a connector according to this aspect includes a connector body defining a longitudinal axis of the connector. The connector body has a jaw portion defining a first outer diameter of the connector body and a body portion defining a second outer diameter of the connector body. The jaw portion extends from an end of the body portion. The second diameter is less than the first diameter. A cap threadably engages the connector body. The cap has a bore extending through the cap. A threaded portion of the bore defines a third diameter which is less than the first diameter.

In an embodiment according to this aspect, the cap is movable in an opening direction and closing direction along the longitudinal axis of the connector. Movement in the opening direction increases a diameter of a pin opening of the connector body. Movement in the closing direction reduces the diameter of the pin opening. Continued movement of cap in the opening direction results in an axial abutment of a first abutment surface of the connector body and a second abutment surface of the cap within an interior annular space defined by the cap.

In an embodiment according to this aspect, the connector body has a jaw portion and a body portion. The jaw portion extends from an end of the body portion. The cap defines an interior annular space. A radial extension of the jaw portion extends radially into the interior annular space. The jaw portion is axially confined within the annular space.

In an embodiment according to this aspect, the threaded portion of the bore of the cap threadably engages a threaded portion of the connector body. An axial extent of the threaded portion of the threaded bore defines the second abutment surface.

In an embodiment according to this aspect, the connector body has a jaw portion and a body portion. The jaw portion extends from an end of the body portion. The jaw portion includes an angled outer surface. The angled outer surface is arranged at an obtuse angle relative to the longitudinal axis. The cap includes a angled surface configured and arranged for sliding contact with the angled outer surface of the connector body.

In another aspect, the invention provides a connector for a cable assembly. An embodiment of such a connector includes a connector body defining a longitudinal axis of the connector. The connector body has a jaw portion and a body portion. The jaw portion extends from an end of the body portion and defines an axial extent of the connector body. A cap is mounted on and movable relative to the connector body. The cap defines an interior annular space. The jaw portion extends radially into the interior annular space. A radial extension of the jaw portion is axially confined within the annular space.

In an embodiment according to this aspect, the jaw portion defines a first outer diameter of the connector body and the body portion defines a second outer diameter of the connector body. The second diameter is less than the first diameter. The cap has a bore extending through the cap. A threaded portion of the bore defines a third diameter which is less than the first diameter.

In an embodiment according to this aspect, the cap is movable in an opening direction and closing direction along the longitudinal axis of the connector. Movement in the opening direction increases a diameter of a pin opening of the connector body. Movement in the closing direction reduces the diameter of the pin opening. Continued movement of cap in the opening direction results in an axial abutment of a first abutment surface of the connector body and a second abutment surface of the cap within an interior annular space defined by the cap.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
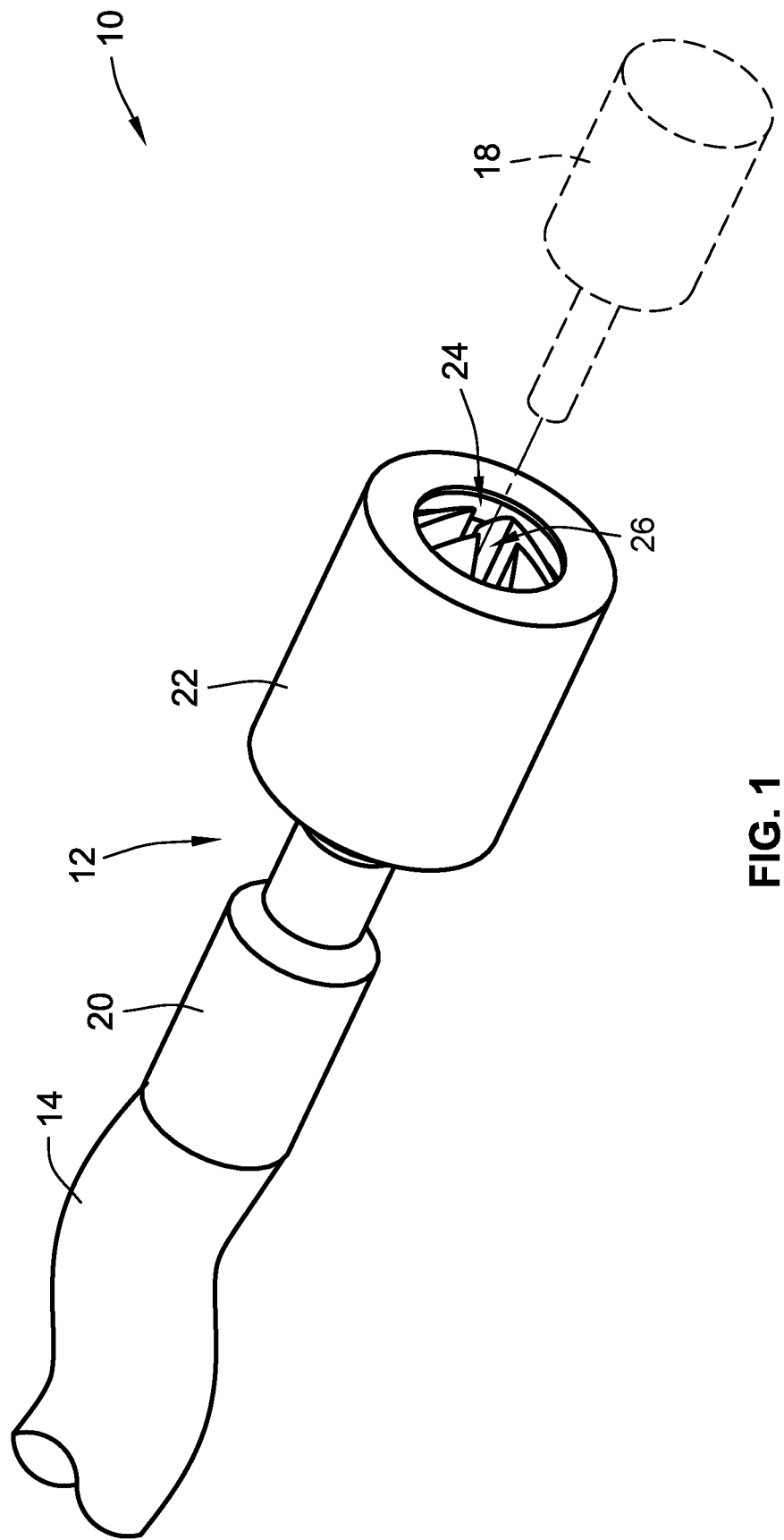
FIG. 1 is a perspective view of an embodiment of a portion of a cable assembly incorporating a connector according to the teaching of the present invention.
Figure 2:
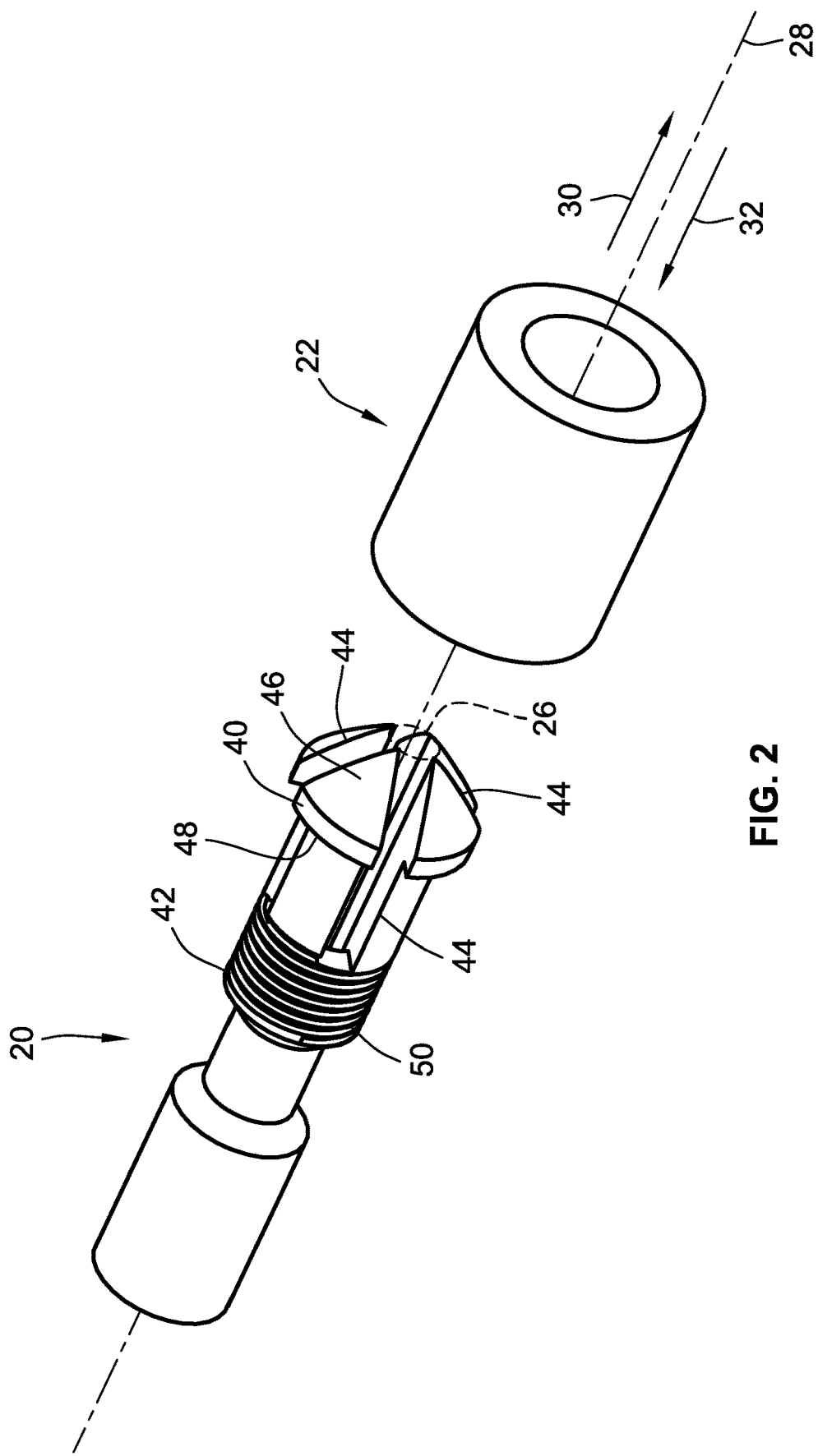
FIG. 2 is an exploded view of the connector of FIG. 1.
Figure 3:
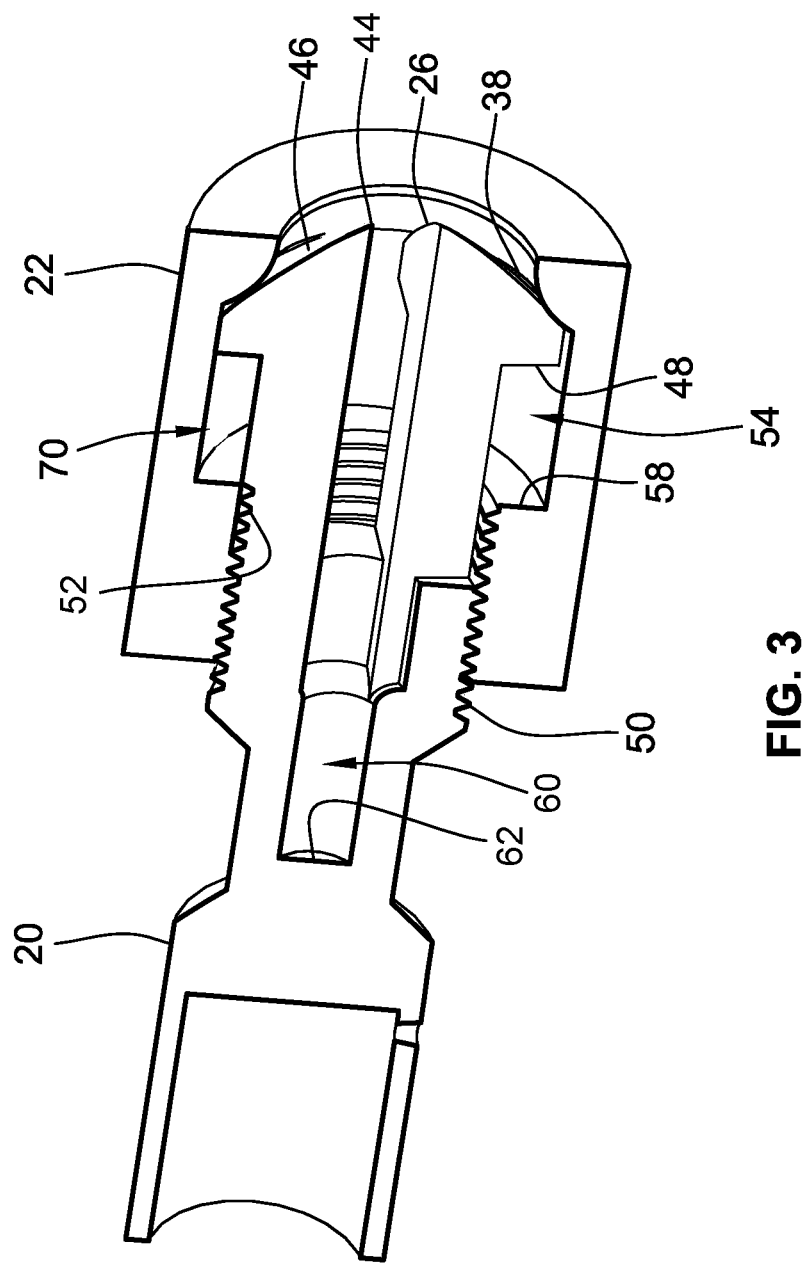
FIG. 3 is a cross section of the connector of FIG. 1.

Turning now to the drawings, FIGS. 1-3 illustrate an embodiment of a cable assembly and associated connector according to the teachings herein. As will be understood from the following, the connector advantageously incorporates a retention feature such that a cap of the connector is not inadvertently removed from a connector body of the connector. This provides a significant advantage over prior designs. Indeed, as mentioned above, in prior designs, loss of the cap in those designs ultimately renders unserviceable the connector and cable assembly incorporating the connector.

With particular reference to FIG. 1, the same illustrates an embodiment of a cable assembly 10 according to the teachings herein. Cable assembly 10 includes a connector 12 affixed to an end of a length of cable 14. While the other end of cable 14 is not shown, it is contemplated that an identical connector 12 may be situated at that end as well. It is also contemplated that any other style of connector may be situated at the end not shown, and the selection thereof will depend upon the particular application of cable assembly 10. Connector 12 is used for forming a connection with a pin style conductive connecting element shown schematically as pin connector 18.

Cable 14 may be any form of conductive electrical cable for transmitting electrical signals. As such, the particular size of cable 14 as well as connector 12 shown is exemplary only. Indeed, connector 12 and cable 14 may be readily scaled up or down depending on a variety of factors including the pin diameter of pin connector 18 to be received by connector 12, the wire gauge of the conductor utilized within cable 14, etc.

Connector 12 includes a connector body 20 and a cap 22 threadably engaging connector body 20. The connector body includes a pin passage 24. Pin passage 24 is configured to receive a pin of pin connector 18 of a device, e.g. an electrode in a medical application. This pin makes contact with the aforementioned conductor of cable 14 when fully inserted within pin passage 24. Pin passage 24 defines a pin opening 26 having a variable pin diameter.

Turning now to FIG. 2, movement of cap 22 along a longitudinal axis 28 defined by connector body 20 in an opening direction 30 increases the aforementioned pin diameter. This increase in pin diameter allows for a pin to be freely inserted or removed from connector 12.

However, movement of cap 22 along longitudinal axis 28 in a closing direction 32 decreases the aforementioned pin diameter. This decrease in pin diameter causes claws (described below) to clamp against a pin inserted in connector 12, thereby restricting or entirely preventing movement of connector 12 relative to pin connector 18 (see FIG. 1). This ensures that cable assembly 10 will not become inadvertently disconnected from pin connector 18, and consequently the device associated with pin connector 18. As such, a highly secure connection is achieved when the pin is fully inserted in connector 12, and when cap 22 is moved in closing direction 32 to create a strong clamping force against the pin.

Turning now to the structural specifics of connector body 20 and cap 22, connector body 20 includes a jaw portion 40 defined by a radially outwardly extending conical section as shown. Jaw portion 40 extends from an end of a body portion 42. Jaw portion 40 has a maximum outer diameter which defines a first diameter of connector body 20. Body portion 42 has a maximum outer diameter which defines a second diameter of connector body 20. As may be seen from inspection of FIG. 2, the first diameter is greater than the second diameter.

Jaw portion 40 and at least a portion of body portion 42 are segmented by slits 44. As a result, a portion of connector body 20 is defined by a plurality of axially extending discrete projections or claws as shown. As will be understood from the following, these slits 44 permit flexure of jaw portion 40 and a portion of body portion 42 as cap 20 moves in the opening and closing directions 30, 32, and hence the capability of increasing or decreasing the pin diameter of pin opening 26. While four slits 44 are shown, fewer or greater slits 44 may be employed.

Jaw portion 40 includes a radially outwardly facing angled surface 46 (collectively formed by the plurality of discrete axial projections shown). This angled outer surface 46 forms an obtuse angle α (see FIG. 3) with longitudinal axis 28, as may be seen from inspection of FIG. 3. This angled outer surface 46 is acted upon by an interior surface 38 of cap 22, causing the aforementioned flexure of jaw portion 40 and body portion 42.

Additionally an underside of jaw portion 40 defines an axially facing first abutment surface 48 (collectively formed by the plurality of discrete axial projections shown). This first abutment surface 48 abuts a second abutment surface 58 (see FIG. 3) of cap 22 as cap 22 continues to move in opening direction 30. This abutment prevents any further movement of cap 22 in opening direction 30.

Threads 50 of connector body 20 are threadably engaged by corresponding threads 52 of cap 22. Threads 52 are formed on a portion of a bore 54 that extends through cap 22 and receives a portion of connector body 20. This portion of bore 54 defines a third diameter (i.e. the inner diameter in this region) which is less than the first diameter defined by jaw portion 40. In other words, this portion of bore 54 undercuts jaw portion 40. An axially facing extent of this threaded portion of bore 54 defines the aforementioned second abutment surface 58.

As may also be seen in FIG. 3, first and second axial abutment surfaces 48, 58 face one another. As cap moves in opening direction 30, these abutment surfaces 48, 58 approach one another until they abut as described above. Conversely, as cap 20 is moved in closing direction 32, a angled surface formed within bore 54 of cap 20 acts upon angled outer surface 46. This forces jaw portion 40 and a portion of body portion 42 to radially approach one another. This action is what causes the above described variation of the pin diameter defined by pin opening 26.

As may also be seen in this view, an annular space 70 is formed between angled surfaced 38 and second abutment surface 58. A portion of jaw portion 40 extends into the annular space 70 and is axially confined therein. Indeed, as described above, continued movement of cap 22 in opening direction 30 results in abutment of first and second abutment surfaces 48, 58 and thus delineates one axial boundary of the axial confinement provided by annular space 70. The other axial boundary is provided by angled surface 38. Indeed, angled surface 38 is sized and arranged such that when cap 22 has moved to is maximum extent along closing direction 32, a radial extension of jaw portion remains axially confined within annular space 70.

Additionally, a pin well 60 is formed at an end of pin passage 24 (see FIG. 1). This pin well 60 terminates at an axially facing wall 62 as shown. Pin well 60 is designed to be deep enough such that a pin connector 18 received within pin passage 24 will not bottom out, i.e. contact axially facing wall 62, before it is fully inserted into pin passage 24. With such a configuration, the likelihood that any conductive portions of pin connector 18 will remain exposed once connector 12 receives the same is eliminated, as this pin well 60 permits full insertion of pin connector 18. Furthermore, this pin well 60 has a reduced diameter as shown in order to provide a centering function when a pin connector 18 is received therein. It will be readily appreciated that the depth of pin well 60, as well as its diameter, may be sized based on the length and diameter of the pin connector that will be received therein. Although pin well 60 is illustrated as cylindrical in shape, it is also conceivable that pin well 60 may be conical in shape such that moisture will tend to drain towards slits 44 and pin opening 26.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cable assembly, comprising:
  a cable having an end;
  a connector connected to the cable at the end thereof, the connector comprising:
    a connector body defining a longitudinal axis of the connector;
    a cap threadably engaging the connector body and movable in an opening direction and closing direction along the longitudinal axis of the connector, wherein movement in the opening direction increases a diameter of a pin opening of the connector body, and wherein movement in the closing direction reduces the diameter of the pin opening;
  wherein continued movement of cap in the opening direction results in an axial abutment of a first abutment surface of the connector body and a second abutment surface of the cap within an interior annular space defined by the cap; and wherein the connector body has a jaw portion defining a first outer diameter of the connector body and a body portion defining a second outer diameter of the connector body, the jaw portion extending from an end of the body portion, the second diameter less than the first diameter.

2. The cable assembly of claim 1, wherein the cap has a bore extending through the cap, wherein a threaded portion of the bore defines a third diameter which is less than the first diameter.

3. The cable assembly of claim 2, wherein the threaded portion of the bore of the cap threadably engages a threaded portion of the connector body, wherein an axial extent of the threaded portion of the threaded bore defines the second abutment surface.

4. The cable assembly of claim 1, wherein the jaw portion extending from an end of the body portion, the cap defining an interior annular space, wherein the jaw portion extends radially into the interior annular space, and wherein a radial extension of the jaw portion is axially confined within the annular space.

5. The cable assembly of claim 1, wherein the connector body includes a plurality of slits such that a portion of the connector body is defined by a plurality of discrete axial projections.

6. The cable assembly of claim 1, wherein the jaw portion extending from an end of the body portion, wherein the jaw portion includes an angled outer surface, the angled outer surface arranged at an obtuse angle relative to the longitudinal axis.

7. The cable assembly of claim 1, wherein the connector body defines a pin passage having a pin well formed at an end of the pin passage, the pin well configured to receive a portion of a pin of a pin connector.

8. A connector for a cable assembly, comprising:
a connector body defining a longitudinal axis of the connector, the connector body having a jaw portion defining a first outer diameter of the connector body and a body portion defining a second outer diameter of the connector body, the jaw portion extending from an end of the body portion, the second diameter less than the first diameter; and
a cap threadably engaging the connector body, the cap having a bore extending through the cap, wherein a threaded portion of the bore defines a third diameter which is less than the first diameter,
wherein the cap is movable in an opening direction and closing direction along the longitudinal axis of the connector, wherein movement in the opening direction increases a diameter of a pin opening of the connector body, and wherein movement in the closing direction reduces the diameter of the pin opening.

9. The connector of claim 8, wherein continued movement of cap in the opening direction results in an axial abutment of a first abutment surface of the connector body and a second abutment surface of the cap within an interior annular space defined by the cap.

10. The connector of claim 8, wherein the threaded portion of the bore of the cap threadably engages a threaded portion of the connector body, wherein an axial extent of the threaded portion of the threaded bore defines a second abutment surface.

11. The connector of claim 8, wherein the connector body has a jaw portion and a body portion, the jaw portion extending from an end of the body portion, wherein the jaw portion includes an angled outer surface, the angled outer surface arranged at an obtuse angle relative to the longitudinal axis.

12. The connector of claim 11, wherein the cap includes angled surface configured and arranged for sliding contact with the angled outer surface of the connector body.

13. A connector for a cable assembly, comprising:
a connector body defining a longitudinal axis of the connector, the connector body having a jaw portion defining a first outer diameter of the connector body and a body portion defining a second outer diameter of the connector body, the jaw portion extending from an end of the body portion, the second diameter less than the first diameter;
a cap threadably engaging the connector body, the cap having a bore extending through the cap, wherein a threaded portion of the bore defines a third diameter which is less than the first diameter, and
wherein the connector body has a jaw portion and a body portion, the jaw portion extending from an end of the body portion, the cap defining an interior annular space, wherein the jaw portion extends radially into the interior annular space, and wherein a radial extension of the jaw portion is axially confined within the annular space.

14. A connector for a cable assembly, the connector comprising:
a connector body defining a longitudinal axis of the connector, the connector body having a jaw portion and a body portion, the jaw portion extending from an end of the body portion and defining an axial extent of the connector body;
a cap mounted on and movable relative to the connector body, the cap defining an interior annular space, wherein the jaw portion extends radially into the interior annular space, and wherein a radial extension of the jaw portion is axially confined within the annular space; and
wherein the jaw portion defines a first outer diameter of the connector body and the body portion defines a second outer diameter of the connector body, the second diameter less than the first diameter.

15. The connector of claim 14, wherein the cap has a bore extending through the cap, wherein a threaded portion of the bore defines a third diameter which is less than the first diameter.

16. The connector of claim 14, wherein the cap is movable in an opening direction and closing direction along the longitudinal axis of the connector, wherein movement in the opening direction increases a diameter of a pin opening of the connector body, and wherein movement in the closing direction reduces the diameter of the pin opening.

17. The connector of claim 16, wherein continued movement of cap in the opening direction results in an axial abutment of a first abutment surface of the connector body and a second abutment surface of the cap within an interior annular space defined by the cap.

* * * * *